United States Patent
Patel et al.

(10) Patent No.: US 10,601,961 B2
(45) Date of Patent: Mar. 24, 2020

(54) SERVICE FUNCTION CHAIN DYNAMIC CLASSIFICATION

(71) Applicant: Cisco Technology, Inc., San Jose, CA (US)

(72) Inventors: Pradeep Patel, Fremont, CA (US); Jianxin Wang, Saratoga, CA (US); Jonathan Augustine Kunder, San Jose, CA (US); Ashish Dey, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 15/648,014

(22) Filed: Jul. 12, 2017

(65) Prior Publication Data
US 2019/0020736 A1 Jan. 17, 2019

(51) Int. Cl.
*H04L 29/06* (2006.01)
*H04L 12/715* (2013.01)
*H04L 12/801* (2013.01)
*H04L 12/725* (2013.01)
*H04L 12/721* (2013.01)
*H04L 12/64* (2006.01)

(52) U.S. Cl.
CPC .......... *H04L 69/161* (2013.01); *H04L 45/306* (2013.01); *H04L 45/64* (2013.01); *H04L 47/127* (2013.01); *H04L 69/22* (2013.01); *H04L 45/566* (2013.01); *H04L 2012/6443* (2013.01)

(58) Field of Classification Search
CPC ........ H04L 69/161; H04L 45/64; H04L 69/22
See application file for complete search history.

(56) References Cited

U.S. PATENT DOCUMENTS

| 6,067,298 A * | 5/2000 | Shinohara ............... H04L 12/28 |
| 2009/0059816 A1* | 3/2009 | Reza ....................... H04L 12/28 |
| 2012/0157106 A1* | 6/2012 | Wang ..................... H04W 16/24 |
| 2013/0247197 A1* | 9/2013 | O'Brien ............. H04L 63/1408 |

(Continued)

FOREIGN PATENT DOCUMENTS

WO WO 2017020949 * 2/2017

OTHER PUBLICATIONS

J. Halpern, et al., "Service Function Chaining (SFC) Architecture", Internet Engineering Task Force (IETF), ISSN: 2070-1721, Oct. 2015, RFC 7665, 32 pages.

(Continued)

*Primary Examiner* — Ronald B Abelson
(74) *Attorney, Agent, or Firm* — Edell, Shapiro & Finnan, LLC

(57) ABSTRACT

In one example, a service function forwarder of a service function chain enabled domain receives, from a classifier of the service function chain enabled domain, network traffic assigned to a service function path that includes at least one service node configured to apply a service function to the network traffic. The service function forwarder forwards the network traffic along the service function path. The service function forwarder receives, from the at least one service node, instructions for dynamically assigning a particular service function path to predicted network traffic that the at least one service node predicts will be triggered by the network traffic. The service function forwarder forwards the instructions to the classifier.

18 Claims, 7 Drawing Sheets

(56) References Cited

U.S. PATENT DOCUMENTS

2014/0379804 A1* 12/2014 Wang .................... H04L 67/104
2016/0173526 A1*  6/2016 Kasman .............. H04L 63/1458
2016/0182684 A1*  6/2016 Connor .................. H04L 67/42
2016/0315921 A1* 10/2016 Dara ....................... H04L 63/06
2017/0126792 A1*  5/2017 Halpern .............. H04L 67/1002
2019/0012909 A1*  1/2019 Mintz ..................... G08G 1/01

OTHER PUBLICATIONS

P. Quinn, et al., "Network Service Header", draft-ietf-sfc-nsh-12.txt, Feb. 23, 2017, Internet-Draft, 37 pages.
"Cisco NSH Service Chaining Configuration Guide", Revised Jul. 28, 2016, Cisco Systems, Inc., 11 pages.
E. Bellagamba, et al., "Configuration of Proactive Operations, Administration, and Maintenance (OAM) Functions for MPLS-Based Transport Networks Using Label Switched Path (LSP) Ping", Internet Engineering Task Force (IETF), ISSN: 2070-1721, Feb. 2016, 29 pages.

* cited by examiner

SERVICE FUNCTION CHAIN DYNAMIC CLASSIFICATION

TECHNICAL FIELD

The present disclosure relates to service function chains.

BACKGROUND

Network services are widely deployed and used in many networks. In many cases, services are provided by chains of independent service functions that follow an ordered sequence of execution, called a service function chain. The services provide a range of functions such as security, wide area network (WAN) acceleration, firewall services, and server load balancing. Service functions that form part of the overall service may be physically located at different points in the network infrastructure, such as the wide area network, data center, campus, and so forth.

DESCRIPTION OF EXAMPLE EMBODIMENTS

Overview

In one embodiment, a service function forwarder of a service function chain enabled domain receives, from a classifier of the service function chain enabled domain, network traffic assigned to a service function path that includes at least one service node configured to apply a service function to the network traffic. The service function forwarder forwards the network traffic along the service function path. The service function forwarder receives, from the at least one service node, instructions for dynamically assigning a particular service function path to predicted network traffic. The predicted network traffic is traffic that the at least one service node predicts will be triggered by the network traffic. The service function forwarder forwards the instructions to the classifier.

Example Embodiments

Figure 1:
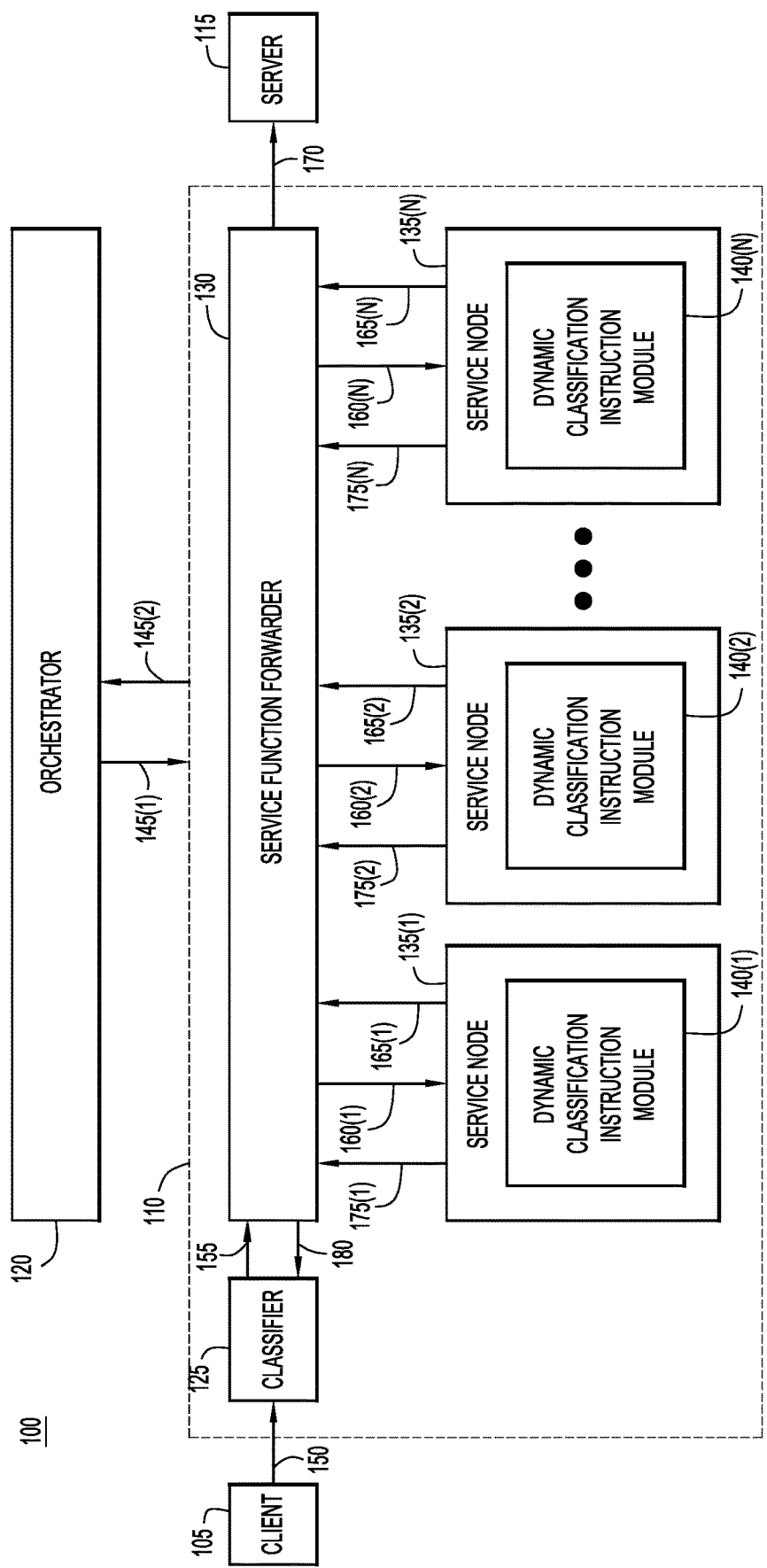
FIG. 1 is system level diagram of a service function chaining environment, according to an example embodiment.

With reference made to FIG. 1, a service function chaining environment 100 is shown in accordance with examples presented herein. A service function chain defines an ordered set of service functions and ordering constraints for network traffic. FIG. 1 shows a client 105 that transmits network traffic through a service function chain enabled domain 110 to a server 115. An orchestrator 120 performs management/control functions for the service function chain enabled domain 110, as shown at 145(1)-145(2). The service function chain enabled domain 110 includes a classifier (e.g., a classifier function) 125, a service function forwarder 130, and a plurality of service nodes 135(1)-135(N). As will be explained in greater detail below, each service node 135(1)-135(N) includes a respective dynamic classification instruction module 140(1)-140(N).

Initially, the orchestrator 120 programs the classifier 125 with classification rules associated with network traffic. For example, the orchestrator 120 may program the classifier 125 to apply certain classification rules to the network traffic based on the destination port, the source port, the destination Internet Protocol (IP) address, and the source IP address of the network traffic. As such, when the client 105 forwards the network traffic 150 to the classifier 125, the classifier 125 matches the network traffic against the classification rules. More specifically, the classifier 125 specifies a service function path for the network traffic. The service function path consists of the specific ones of the service nodes 135(1)-135(N) to apply a service function to the network traffic. The classifier 125 may encapsulate the traffic in a service header, such as a Network Service Header (NSH) as described in draft-ietf-sfc-nsh-12 that specifies the service function path for the network traffic.

In one example, the classifier 125 encapsulates the network traffic with a NSH that specifies a service function path comprising each of service nodes 135(1)-135(N). The classifier 125 forwards the encapsulated network traffic 155 to the service function forwarder 130. Based on the content of the NSH, the service function forwarder 130 forwards the network traffic as shown at 160(1) to service node 135(1). Service node 135(1) receives the traffic and applies a service function to the network traffic. For example, if service node 135(1) performs a network address translation (NAT) function, service node 135(1) may apply, to the network traffic, service functions related to network address translation. Service node 135(1) forwards the network traffic back to the service function forwarder 130 as shown at 165(1).

After receiving the traffic from the service node 135(1), the service function forwarder 130 may, based on the NSH, forward the traffic to service node 135(2) as shown at 160(2). Like service node 135(1), service node 135(2) receives the traffic and applies a service function to the network traffic. For example, if service node 135(2) is a firewall, service node 135(2) may apply, to the network traffic, select firewall related network security functions. Service node 135(2) then forwards the network traffic back to the service function forwarder 130 as shown at 165(2).

This operational flow may continue until the service function forwarder 130 forwards the traffic to service node 135(N) as shown at 160(N). Service node 135(N) applies a service function to the network traffic and forwards the traffic back to the service function forwarder 130 as shown at 165(N). For example, service node 135(N) may capture a copy of packet(s) of the network traffic. The service function forwarder 130 then forwards the traffic to the server 115 as shown at 170.

The (original) network traffic received by the server 115 may prompt/trigger additional network traffic that is related to the original network traffic received by the server 115. For example, the original network traffic received by the server 115 may be a File Transport Protocol (FTP) request to download a file. Because the original network traffic is a FTP request, the original network traffic is transmitted to a particular port, e.g., port 21, of the server 115. The server 115 may respond to the client 105 with instructions to open a connection on another port on the server 115 in order to download the file. In response, the client 105 transmits additional network traffic to the server 115 to establish a connection with the other port on the server 115.

Because the connection with the other port is dynamic, the orchestrator 120 may not have previously programmed the classifier 125 with classification rules associated with the additional network traffic. As such, conventionally, a classifier may apply different classification rules to the additional network traffic than to the original network traffic. This can lead to undesirable results, such as dropping the additional network traffic, permitting the additional network traffic to proceed to a server without subjecting the additional network traffic to the appropriate security policies, etc.

As such, techniques are presented to permit classifier 125 to apply a particular service function path to the additional network traffic. To this end, dynamic classification instruction modules 140(1)-140(N) enable respective service nodes 135(1)-135(N) to predict additional network traffic that the original network traffic will trigger, and to forward to the classifier 125 classification instructions for the additional network traffic.

After receiving the original network traffic (e.g., as shown at 160(1)), service node 135(1) may predict additional network traffic that the original network traffic will trigger. For instance, the service node 135(1) may examine the FTP request to predict the source port, the destination IP address, and the source IP address of additional FTP traffic that the FTP request will trigger. In one example, the service node 135(1) may predict that any additional traffic with an identical source port, destination IP address, and source IP address was prompted/triggered by the original network traffic, if the additional network traffic is received within a specified time frame. Based on this prediction, the service node 135(1) generates instructions for dynamically assigning a particular service function path to the predicted network traffic. The particular service function path may be identical to the service function path for the original network traffic, or it may be a different service function path.

The service node 135(1) forwards the instructions shown at 175(1) to the service function forwarder 130, which forwards the instructions to the classifier 125 as shown at 180. In one example, after receiving the traffic, the service node 135(1) may receive the traffic and generate instructions 175(1) to add service node 135(1) to the service function path for the predicted traffic. This may help ensure that the original network traffic and the predicted network traffic are assigned to and traverse identical service function paths. Service nodes 135(2)-135(N) may also/alternatively transmit instructions shown at reference numerals arrows 175(2)-175(N) to the service function forwarder 130, which forwards the instructions 175(2)-175(N) to the classifier 125.

When the classifier 125 receives the instructions 175(1)-175(N), the classifier 125 may forward responses to the service nodes 135(1)-135(N) confirming, for example, that the classifier 125 received the instructions 175(1)-175(N). If the classifier 125 subsequently receives the predicted network traffic from the client 105, the classifier 125 may dynamically assign a particular service function path based on the instructions 175(1)-175(N). The service function forwarder 130 then receives, from the classifier 125, the predicted (additional) network traffic and forwards the predicted network traffic along the particular service function path (e.g., to service nodes 135(1), 135(2) . . . 135(N)).

Figure 2:
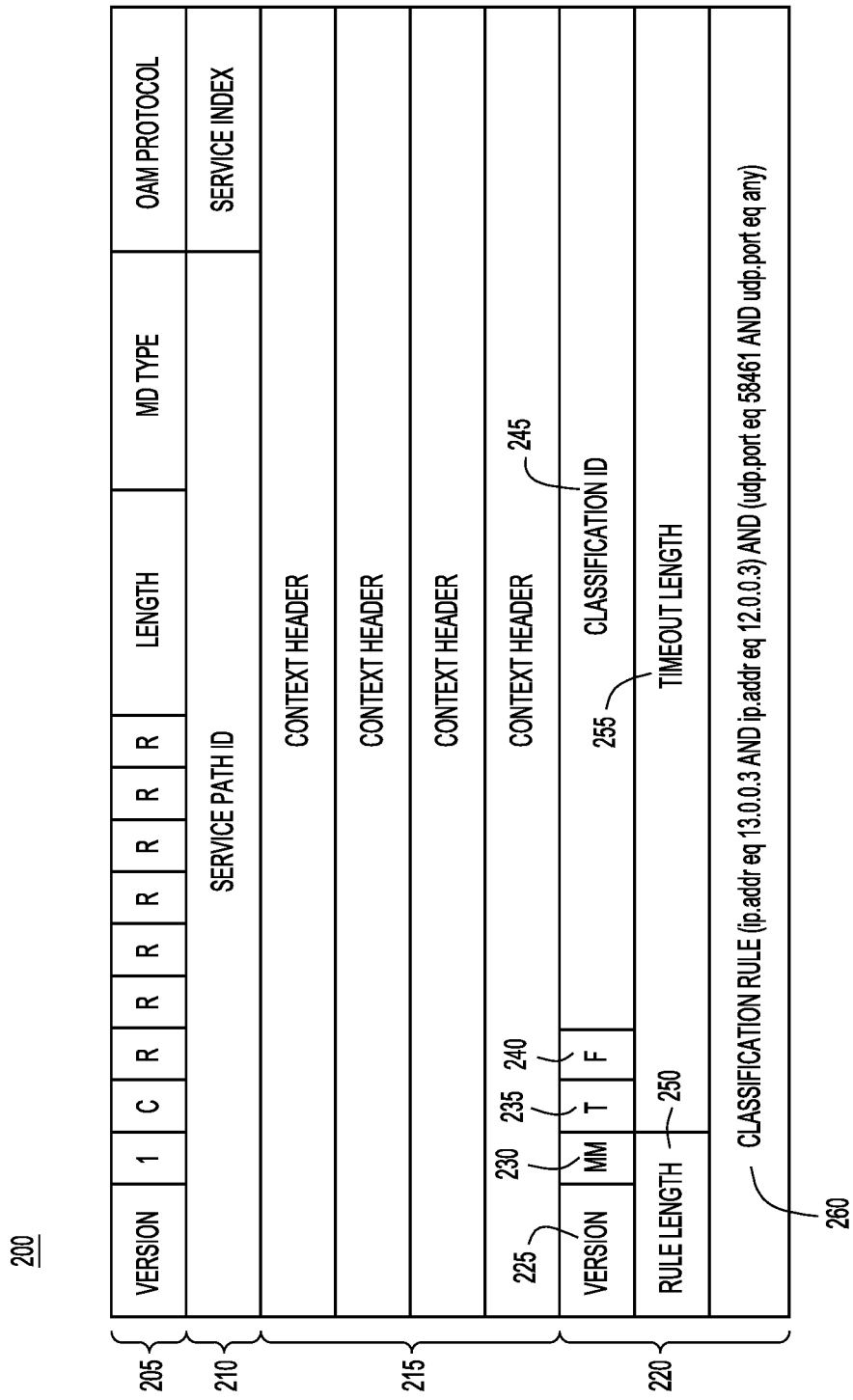
FIG. 2 illustrates a network service header (NSH) operations, administration, and management (OAM) header including instructions for dynamically assigning a service function path to predicted network traffic, according to an example embodiment.
Figure 3:
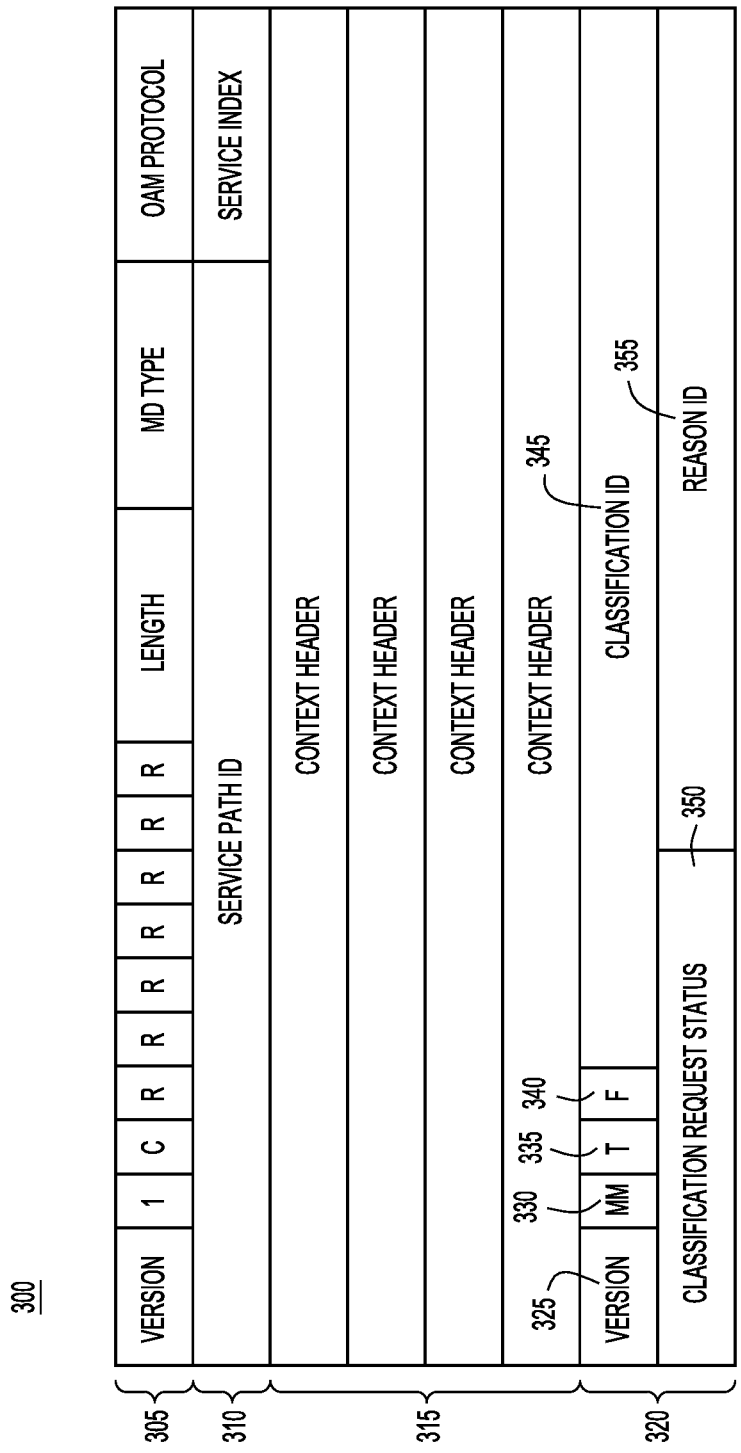
FIG. 3 illustrates another NSH OAM header including a response to the instructions of FIG. 2, according to an example embodiment.

Reference is now made to FIGS. 2 and 3, with continued reference to FIG. 1. FIG. 2 shows an NSH operations, administration, and management (OAM) header 200 configured to operate as a classification request and FIG. 3 shows an NSH OAM header 300 configured to operate as a classification response. The NSH OAM headers 200 and 300 are extensions of a standard NSH-OAM header. The NSH OAM header 200 is an example of how instructions 175(1)-175(N) may be sent from a service node to the classifier 125, and the NSH OAM header 300 is an example of how the classifier 125 may send to a service node a response to the instructions 175(1)-175(N).

Turning first to FIG. 2, NSH OAM header 200 includes a base header 205, a service path header 210, variable length context headers 215, and extension headers 220. The extension headers 220 are modified to include classification instructions. Specifically, extension headers 220 include fields for the version 225, the classification message type MM 230, a timeout indicator T 235, the classification format type F 240, a classification identifier (ID) 245, the rule length 250, the timeout length 255, and the classification rule 260.

The classification message type MM 230 may be set to 00 or 01. 00 may instruct the classifier 125 to use the service path ID in the service path header 210 for the predicted traffic. In an example, 00 instructs the classifier 125 to add to the service function path for the predicted network traffic, the particular service node 135(1), 135(2), etc. that sends the NSH OAM header 200. 01 may instruct the classifier 125 not to use the service path ID in the service path header 210 for the predicted traffic. In an example, 01 instructs the classifier 125 to remove, from the service function path for the predicted network traffic, the particular service node 135(1), 135(2), etc. that sends the NSH OAM header 200. Thus, the classification message type MM 230 may instruct the classifier 125 to add or remove a service node from the service function path and/or to use or to not use the service function path corresponding to the service path ID.

The timeout indicator T 235 defines a period of time during which the classifier is to dynamically assign the service function path to the predicted network traffic and at the expiration of which period of time it is to no longer do such assignment. The timeout indicator T 235 may be set to 0 or 1. 0 indicates that there is no timeout, and 1 indicates that there is a timeout. If there is a timeout, the NSH OAM header 200 may specify a timeout length 255 (e.g., in seconds).

The classification format type F 240 may be set to 0 (corresponding to a particular network analyzer protocol format) or 1 (corresponding to an Access Control List). The classification ID 245 correlates classification requests with classification responses, as explained in greater detail below.

The rule length 250 defines the length of the classification rule 260. The classification rule 260 specifies the source and destination ports and IP addresses associated with the instructions. As one example, the source IP address is 13.0.0.3, the destination IP address is 12.0.0.3, the source User Datagram Protocol (UDP) port is 58461, and the destination UDP port is any port. The classification rule 260 may be a five-tuple and may cause the classifier 125 to dynamically update its classification table.

In an example, the classifier 125 receives NSH OAM header 200 from service node 135(1) with classification message type MM 230 set to 00. In this example, if the classifier 125 receives the (predicted) network traffic having a source IP address equal to 13.0.0.3, a destination IP address equal to 12.0.0.3, and a source UDP port equal to port 58461 within the specified timeout length 255 (if any), the classifier 125 directs the predicted network traffic to the specified service function path or adds service node 135(1) to the service function path.

Turning now to FIG. 3, an NSH OAM header 300 is described. As mentioned, in response to receiving a packet encapsulated in NSH OAM header 200, the classifier 125 may send a packet encapsulated in NSH OAM header 300. NSH OAM header 300 includes a base header 305, a service path header 310, variable length context headers 315, and extension headers 320. Extension headers 320 include fields for the version 325, the classification message type MM 330, a timeout indicator T 335, the classification format type F 340, a classification ID 345, the classification request status 350, and the reason ID 355.

The fields for the version 325, classification message type MM 330, timeout indicator T 335, classification format type F 340, and classification ID 345 may be similar to the corresponding fields in the NSH OAM header 200. The classification message type MM 330 may be set to 11 to signal that the NSH OAM header 300 is a classification response to NSH OAM header 200. The classification ID 345 maps a classification response to a prior classification request. For example, if classification ID 345 of the NSH OAM header 300 matches the classification ID 245 of the NSH OAM header 200, a service node may determine that the NSH OAM header 300 is a response to NSH OAM header 200. The classification request status 350 may indicate, for example, whether the classifier 125 accepted, rejected, or did not understand the instructions in the NSH OAM header 200. The reason ID 355 may provide an ID corresponding to a reason why the classifier 125 rejected or did not understand the instructions.

Figure 4:
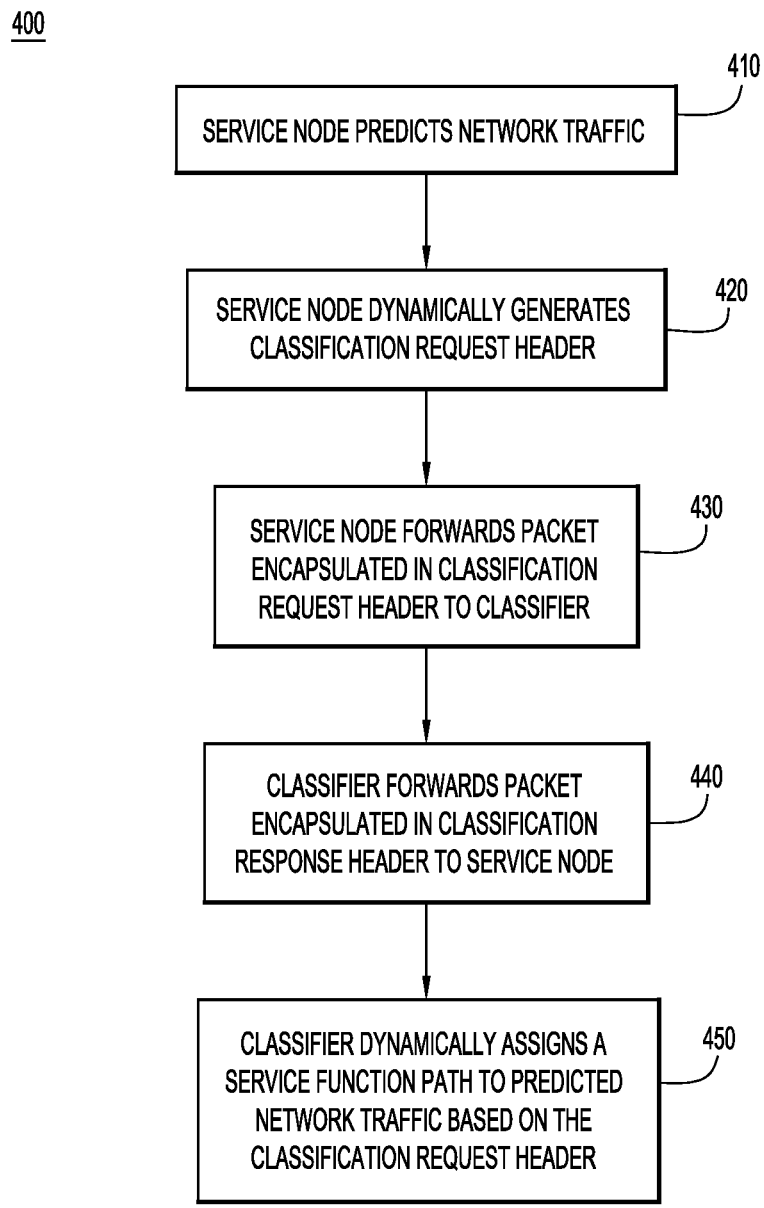
FIG. 4 is a flowchart of a method for dynamic service function chain classification in accordance with examples presented herein.

FIG. 4 is a flowchart 400 of a method in accordance with examples presented herein. At 410, a service node, such as service node 135(1), predicts network traffic. The service node may predict network traffic by, for example, examining a source IP address, a destination IP address, and a source port of a packet to which the service node applies a service function. The service node may conclude that any additional network traffic received within a given time frame that has the source IP address, destination IP address, and source port of the packet was prompted/triggered by the packet.

At 420, the service node dynamically generates an NSH OAM header (e.g., NSH OAM header 200). The NSH OAM header may include instructions for the classifier to add the service node to the service function path of any qualifying additional network traffic. At 430, the service node forwards a packet encapsulated in the NSH OAM header to the classifier (e.g., classifier 125) for the service function chain enabled domain. The encapsulated packet may be forwarded from the service node to a service function forwarder, which forwards the encapsulated packet to the classifier.

At 440, the classifier forwards a packet encapsulated in another NSH OAM header (e.g., NSH OAM 300) to the service node. This encapsulated packet may be forwarded from the classifier to a service function forwarder, which forwards the encapsulated packet to the service node. The other NSH OAM header may include a response to the instructions. For example, the response may indicate that the classifier accepted, rejected, or did not understand the instructions. At 450, the classifier dynamically assigns a service function path, based on the instructions, to the predicted network traffic.

Figure 5:
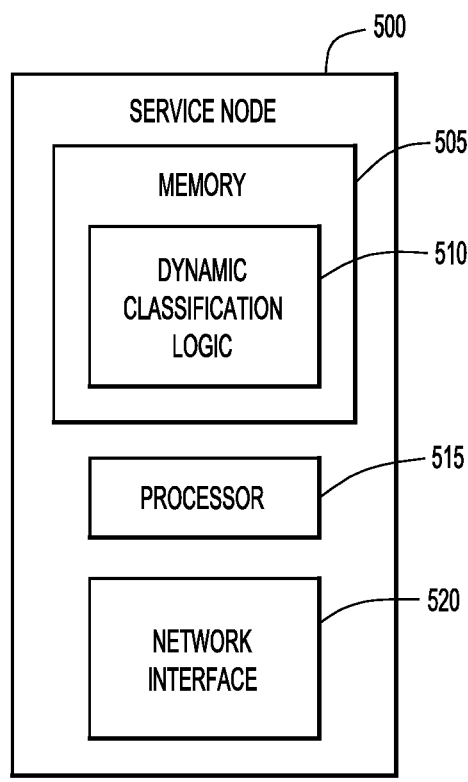
FIG. 5 is a block diagram of a computing device configured to execute dynamic service function chain classification techniques, according to an example embodiment.

FIG. 5 is a block diagram of a service node 500, such as one of service nodes 135(1)-135(N) shown in FIG. 1, which is configured to perform the techniques presented herein. In this example, the service node 500 is a server that includes a memory 505, which includes dynamic classification logic 510, one or more processors 515, and a network interface 520. The one or more processors 515 are configured to execute instructions stored in the memory 505 (e.g., dynamic classification logic 510). When executed by the one or more processors 515, the dynamic classification logic 510 enables the service node 500 to perform the operations associated with dynamic classification modules 140(1)-140(N) (FIG. 1). The network interface 520 includes a plurality of ports (not shown) at which the service node 500 can receive packets and from which the service node 500 can send packets.

The memory 505 may be read only memory (ROM), random access memory (RAM), magnetic disk storage media devices, optical storage media devices, flash memory devices, electrical, optical, or other physical/tangible memory storage devices. Thus, in general, the memory 505 may comprise one or more tangible (non-transitory) computer readable storage media (e.g., a memory device) encoded with software comprising computer executable instructions and when the software is executed (by the processor 515) it is operable to perform the operations described herein. A service node may also be a network element (e.g., switch, router, gateway, etc.). If a service node is a network element, the service node may include network processing hardware that controls the directing it receives from the network at one port to one or more other ports back to the network.

Figure 6:
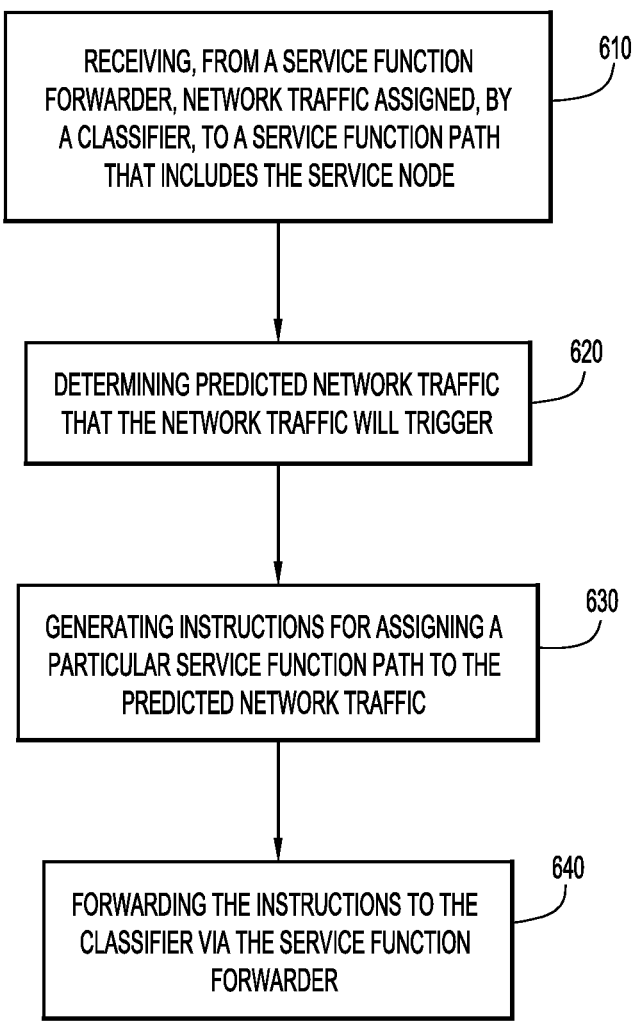
FIG. 6 is a flowchart of a generalized method performed by a service node in accordance with examples presented herein.

FIG. 6 is a flowchart 600 of a method in accordance with examples presented herein. The method depicted in FIG. 6 may be performed at a service node configured to apply a service function to network traffic. At 610, the service node receives, from a service function forwarder, network traffic assigned, by a classifier, to a service function path that includes the service node. At 620, the service node determines predicted network traffic that the network traffic will trigger. At 630, the service node generates instructions for assigning a particular service function path to the predicted network traffic. At 640, the service node forwards the instructions to the classifier via the service function forwarder.

As described herein, a service node may predict additional network traffic prompted/triggered by original network traffic to ensure the additional network traffic follows a particular service function path. The service node may predict the additional network traffic by examining the original network traffic for, e.g., a source IP address, a destination IP address, and a source port. The service node may determine that, if additional network traffic is received within a specified timeout and has a source IP address, destination IP address, and source port identical to the original network traffic, then the additional network traffic was prompted/triggered by the original network traffic. Based on this determination, the service node may instruct the classifier (e.g., via NSH OAM header 200) to add the service node to the service function path of any such additional network traffic. This ensures, for example, that the same service node applies the service functions to the additional network traffic as to the original network traffic. It will be understood that the service node may utilize any (e.g., IP/port-based) classification, and that the destination port may or may not serve as the wild card. For example, the classification may involve specified enumerated ranges of, and/or wild cards for, IP addresses/ports.

Figure 7:
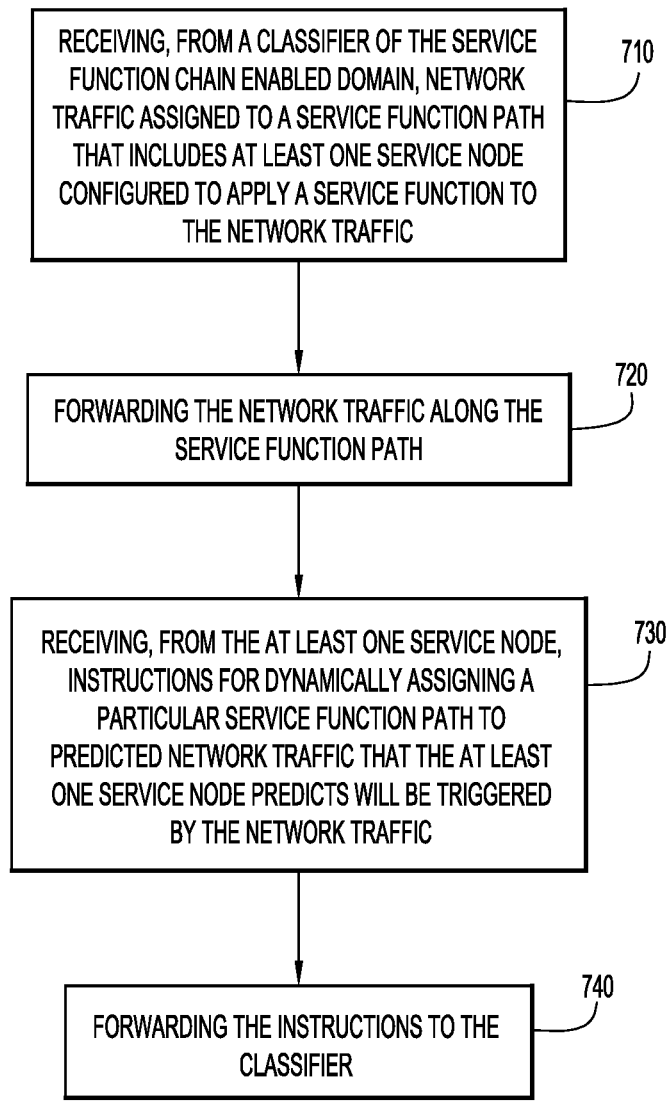
FIG. 7 is a flowchart of a generalized method performed by a service function forwarder in accordance with examples presented herein.

FIG. 7 is a flowchart 700 of a method performed at a service function forwarder of a service function chain enabled domain in accordance with examples presented herein. At 710, the service function forwarder receives, from a classifier of the service function chain enabled domain, network traffic assigned to a service function path that includes at least one service node configured to apply a service function to the network traffic. At 720, the service function forwarder forwards the network traffic along the service function path. At 730, the service function forwarder receives, from the at least one service node, instructions for dynamically assigning a particular service function path to predicted network traffic that the at least one service node predicts will be triggered by the network traffic. At 740, the service function forwarder forwards the instructions to the classifier.

As described herein, a service function forwarder may facilitate communications between the classifier and a service node. For instance, the service function forwarder may receive network traffic from the classifier, and forward the network traffic to the service node as specified by the classifier. The service function forwarder may also receive, from the service node, instructions for the classifier to dynamically assign a service function path to predicted additional network traffic. The service function forwarder may forward these instructions (e.g., NSH OAM header 200) to the classifier. In addition, if the service function forwarder receives, from the classifier, a response acknowledging receipt of the instructions, the service function forwarder may forward the response (e.g., NSH OAM header 300) to the service node.

The service chaining architecture and related techniques presented herein may handle secondary, tertiary, etc. connections, and provides security for specific applications/protocols/software packages (e.g., Session Initiation Protocol (SIP), Web Real-Time Communication (WebRTC), etc.). In addition, these techniques may avoid service interruption due to dropped packets. Further, service nodes may perform service (e.g., security) functions for all traffic associated with certain applications, rather than only on the original network traffic.

In one form, a method is provided. The method comprises: at a service function forwarder of a service function chain enabled domain: receiving, from a classifier of the service function chain enabled domain, network traffic assigned to a service function path that includes at least one service node configured to apply a service function to the network traffic; forwarding the network traffic along the service function path; receiving, from the at least one service node, instructions for dynamically assigning a particular service function path to predicted network traffic that the at least one service node predicts will be triggered by the network traffic; and forwarding the instructions to the classifier.

In another form, an apparatus is provided. The apparatus comprises: a network interface configured to interface with a classifier of a service function chain enabled domain and at least one service node configured to apply a service function to network traffic; a memory; and one or more processors coupled to the memory, wherein the one or more processors are configured to: receive, from the classifier, the network traffic, wherein the network traffic is assigned to a service function path that includes the at least one service node; forward the network traffic along the service function path; receive, from the at least one service node, instructions for dynamically assigning a particular service function path to predicted network traffic that the at least one service node predicts will be triggered by the network traffic; and forward the instructions to the classifier.

In another form, one or more non-transitory computer readable storage media are provided. The non-transitory computer readable storage media are encoded with instructions that, when executed by a processor, cause the processor to: at a service function forwarder of a service function chain enabled domain: receive, from a classifier of the service function chain enabled domain, network traffic assigned to a service function path that includes at least one service node configured to apply a service function to the network traffic; forward the network traffic along the service function path; receive, from the at least one service node, classification instructions for dynamically assigning a particular service function path to predicted network traffic that the at least one service node predicts will be triggered by the network traffic; and forward the classification instructions to the classifier.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
  at a service function forwarder of a service function chain enabled domain:
    obtaining, from a classifier of the service function chain enabled domain, a network packet assigned to a service function path that includes at least one service node configured to apply a service function to the network packet;
    providing the network packet along the service function path;
    obtaining, from the at least one service node, a network service header operations, administration, and maintenance (NSH OAM) header, wherein instructions for dynamically assigning a particular service function path to a predicted network packet that the at least one service node predicts will be triggered by the network packet are included in an extension header of the NSH OAM header;
    providing the NSH OAM header to the classifier;
    obtaining, from the classifier, the predicted network packet, wherein the predicted network packet is dynamically assigned to the particular service function path based on the instructions; and
    providing the predicted network packet along the particular service function path.

2. The method of claim 1, wherein obtaining the NSH OAM header includes:
  obtaining instructions to add the at least one service node to the particular service function path, to remove the at least one service node from the particular service function path, to use an existing service function path as the particular service function path, or to not use the existing service function path as the particular service function path.

3. The method of claim 1, wherein the NSH OAM header includes fields for one or more of a classification message type, a timeout indicator, a timeout length, or a classification identifier.

4. The method of claim 1, further comprising:
obtaining, from the classifier, a response confirming that the classifier obtained the NSH OAM header; and
providing the response to the at least one service node.

5. The method of claim 4, wherein:
obtaining the response includes obtaining another NSH OAM header, wherein the response comprises information included in an extension header of the other NSH OAM header; and
providing the response includes providing the other NSH OAM header.

6. The method of claim 1, wherein obtaining the NSH OAM header includes:
obtaining an indication of a length of time during which the classifier is to dynamically assign the particular service function path to the predicted network packet.

7. An apparatus comprising:
a network interface configured to interface with a classifier of a service function chain enabled domain and at least one service node configured to apply a service function to a network packet;
a memory; and
one or more processors coupled to the memory and the network interface, wherein the one or more processors are configured to:
obtain, from the classifier, the network packet, wherein the network packet is assigned to a service function path that includes the at least one service node;
provide the network packet along the service function path;
obtain, from the at least one service node, a network service header operations, administration, and maintenance (NSH OAM) header, wherein instructions for dynamically assigning a particular service function path to a predicted network packet that the at least one service node predicts will be triggered by the network packet are included in an extension header of the NSH OAM header;
provide the NSH OAM header to the classifier;
obtain, from the classifier, the predicted network packet, wherein the predicted network packet is dynamically assigned to the particular service function path based on the instructions; and
provide the predicted network packet along the particular service function path.

8. The apparatus of claim 7, wherein the one or more processors are configured to:
obtain the NSH OAM header including obtaining instructions to add the at least one service node to the particular service function path, to remove the at least one service node from the particular service function path, to use an existing service function path as the particular service function path, or to not use the existing service function path as the particular service function path.

9. The apparatus of claim 7, wherein the one or more processors are further configured to:
obtain, from the classifier, a response confirming that the classifier obtained the NSH OAM header; and
provide the response to the at least one service node.

10. The apparatus of claim 9, wherein the one or more processors are configured to:
obtain the response by obtaining another NSH OAM header, wherein the response comprises information included in an extension header of the other NSH OAM header; and
provide the response by providing the other NSH OAM header.

11. The apparatus of claim 7, wherein the NSH OAM header includes fields for one or more of a classification message type, a timeout indicator, a timeout length, or a classification identifier.

12. The apparatus of claim 7, wherein the one or more processors are further configured to:
obtain an indication of a length of time during which the classifier is to dynamically assign the particular service function path to the predicted network packet.

13. One or more non-transitory computer readable storage media encoded with instructions that, when executed by a processor, cause the processor to:
at a service function forwarder of a service function chain enabled domain:
obtain, from a classifier of the service function chain enabled domain, a network packet assigned to a service function path that includes at least one service node configured to apply a service function to the network packet;
provide the network packet along the service function path;
obtain, from the at least one service node, a network service header operations, administration, and maintenance (NSH OAM) header, wherein classification instructions for dynamically assigning a particular service function path to predicted network packet that the at least one service node predicts will be triggered by the network packet are included in an extension header of the NSH OAM header;
provide the NSH OAM header to the classifier;
obtain, from the classifier, the predicted network packet, wherein the predicted network packet is dynamically assigned to the particular service function path based on the classification instructions; and
provide the predicted network packet along the particular service function path.

14. The one or more non-transitory computer readable storage media of claim 13, wherein:
the instructions that cause the processor to obtain the NSH OAM header include instructions that cause the processor to obtain classification instructions to add the at least one service node to the particular service function path, to remove the at least one service node from the particular service function path, to use an existing service function path as the particular service function path, or to not use the existing service function path as the particular service function path.

15. The one or more non-transitory computer readable storage media of claim 13, wherein the instructions further cause the processor to:
obtain, from the classifier, a response confirming that the classifier obtained the NSH OAM header; and
provide the response to the at least one service node.

16. The one or more non-transitory computer readable storage media of claim 13, wherein the NSH OAM header includes fields for one or more of a classification message type, a timeout indicator, a timeout length, or a classification identifier.

17. The one or more non-transitory computer readable storage media of claim 13, wherein the instructions that cause the processor to obtain the NSH OAM header include instructions that cause the processor to obtain an indication of a length of time during which the classifier is to dynamically assign the particular service function path to the predicted network packet.

18. The one or more non-transitory computer readable storage media of claim 15, wherein the instructions that cause the processor to:
obtain the response include instructions that cause the processor to obtain another NSH OAM header, wherein the response comprises information included in an extension header of the other NSH OAM header; and
provide the response include instructions that cause the processor to provide the other NSH OAM header.

* * * * *